3,344,135
SELECTED N-THIONITROSOAMINES AND THEIR PREPARATION FROM N-AMINO AMINES
William J. Middleton, Wilmington, Del., assignor to E. I. du Pont de Nemours and Company, Wilmington, Del., a corporation of Delaware
No Drawing. Filed Nov. 25, 1964, Ser. No. 413,989
11 Claims. (Cl. 260—239)

This invention relates to, and has as its principal objects provision of, novel compositions of matter, N-thionitrosoamines, and the synthesis of the same.

The present novel compounds have the generic formula

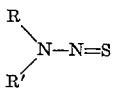

wherein R and R', which can be alike or different, represent two alkyl groups of up to 12 carbons each or one alkylene group of 2–12 carbons. These compounds are purple oils useful as inhibitors against vinyl polymerization.

The compounds of this invention may be prepared by two methods. The first is by the reaction of certain hydrazines with sulfur according to the partial equation:

(I) 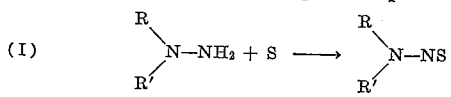

The other method of preparation is by the reduction of certain thionylhydrazines with lithium aluminum hydride according to the partial equation:

(II) 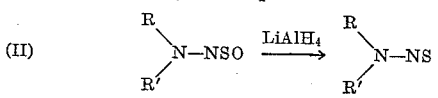

In both Equations I and II, R and R' are as described above.

The reaction of Method, or Equation, I is carried out by stirring a mixture of powdered elemental sulfur and a 1,1-dialkylhydrazine in an inert reaction medium. Any form of crystalline, nonpolymeric sulfur can be used, rhombic sulfur (α-sulfur) being preferred. The reaction is most conveniently carried out within a temperature range of from 0° to 50° C., 20–25° being the preferred range. Lower temperatures are operable, but the reaction is appreciably slower at lower temperatures. High temperatures are also operable, but high temperatures lead to extensive decomposition of the thionitrosoamines formed. Pressure is not critical and pressures of 0.5–5 atmospheres can be employed. Atmospheric pressure is preferred for convenience.

The reaction medium can be any fluid that is inert to sulfur, to the hydrazine, and to the thionitrosoamine formed. Preferred reaction media are ethers, such as diethyl ether and tetrahydrofuran, and hydrocarbons, such as pentane, benzene and toluene.

The course of the reaction can be followed visually by the purple or blue color developed during the reaction period. The reaction normally requires from 1 to 1000 hours. When the coloration becomes intense, the excess, undissolved sulfur, if any, can be removed by filtration. The N-thionitrosoamines can then be isolated and purified by ordinary methods, e.g., distillation under reduced pressure or recrystallization.

The hydrazines used in Method I are known compounds which are commercial products or can be prepared by the reduction of N-nitrosoamines.

The reaction of Method II is accomplished by adding a solution of lithium aluminum hydride in an inert solvent to a cooled and stirring solution of a dialkylthionyl- hydrazine in an inert solvent. The reaction is conducted at a temperature of from −100° to 0° C., the range of −80° to −20° C. being preferred. The reaction medium is preferably an ether, such as an acyclic ether, e.g., diethyl ether or dibutyl ether, or a cyclic ether, e.g., tetrahydrofuran. As in Method I, pressure is not critical and pressures in the range of 0.5–5 atm. can be used, atmospheric pressure being preferred for convenience. The thionitrosoamines formed by this method can be isolated from the reaction mixture by ordinary procedures, e.g., distillation under reduced pressure or recrystallization.

The thionylhydrazines used in Method II can be prepared by distilling an equimolar mixture of a 1,1-dialkylhydrazine and thionylaniline.

There follow some nonlimiting examples which illustrate the process and composition of the invention in more detail. In these examples, pressures are ambient unless otherwise indicated. Examples 1–3 are carried out by Method I while Examples 4 and 5 are carried out by Method II.

EXAMPLE 1

*N-thionitrosodimethylamine*

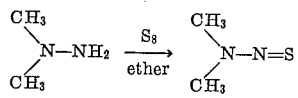

A mixture of 400 ml. of ether, 64 g. (2 g. atoms) of powdered rhombic sulfur, and 60 g. (1 mole) of 1,1-dimethylhydrazine was stirred at 25° C. for six days. The undissolved sulfur was removed by filtration, and the purple filtrate was evaporated to dryness under reduced pressure. The purple residue was recrystallized from ether at low temperature (−78° C.), and then dried under vacuum at 0° C. to give 13.65 g. (15% conversion) of N-thionitrosodimethylamine, M.P. 20–21° C.

*Analysis.*—Calcd. for $C_2H_6N_2S$: C, 29.14; H, 6.94; N, 31.02; S, 35.12; M.W. 90.15. Found: C, 28.65; H, 6.67; N, 31.08; S, 35.37; M.W. (f.p. benzene) 90.

Solutions of N-thionitrosodimethylamine in nonpolar solvents are purple to blue. Solutions in polar solvents are orange-red to purple. The following table shows the ultraviolet and visible spectrum maxima for N-thionitrosodimethylamine in three different solvents.

| Solvent | $\lambda_{max.}$, m$\mu$ | $\epsilon$ |
|---|---|---|
| Cyclohexane | 705 | 1.5 |
|  | 587 | 27.3 |
|  | 306 | 11,900 |
| Carbon Tetrachloride | 685 | 1.8 |
|  | 576 | 38 |
|  | 309 | 12,300 |
| Ethanol | 680 | 1.0 |
|  | 533 | 17.5 |
|  | 306 | 10,800 |

The proton nuclear magnetic resonance spectrum of a 10% solution of this compound in carbon tetrachloride showed two singlets at 3.60 and 4.10 parts per million lower field from the resonance of tetramethylsilane used as internal standard. This spectrum indicates a planer molecule with one methyl group nearer to the sulfur atom than the other. The infrared spectrum contained strong bands at 6.78μ, 7.45μ, and 9.05μ, with weaker bands at 3.40μ, 6.91μ, 7.95μ, 9.40μ, and 10.92μ.

EXAMPLE 2

*N-thionitrosopiperidine*

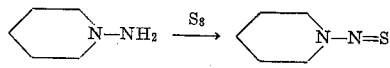

N-thionitrosopiperidine was obtained in a reaction similar to that of Example 1 with the substitution of N-aminopiperidine for 1,1-dimethylhydrazine. The product was a purple oil,

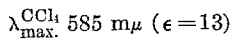

and

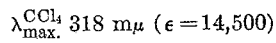

EXAMPLE 3

*N-thionitrosohomopiperidine*

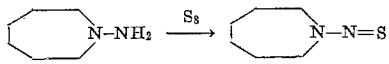

N-thionitrosohomopiperidine was obtained in a process similar to that of Example 1 by the reaction of sulfur with N-aminohomopiperidine. The compound is a purple oil

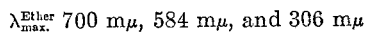

EXAMPLE 4

*N-thionitrosodimethylamine*

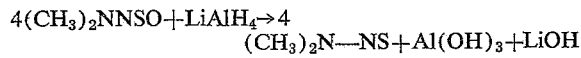

A stirred solution of 26.5 g. (0.25 mole) of dimethylthionylhydrazine in 100 ml. of ether was cooled to $-75°$, and 63 ml. of a 1 M solution (0.063 mole) of lithium aluminum hydride in ether was added dropwise over a period of one hour. The reaction mixture was allowed to warm to room temperature, stirred for one hour, and filtered under nitrogen. The puple filtrate was concentrated by distillation at room temperature and reduced pressure (0.01 mm.) until no further distillate came over. The deep-purple residue was recrystallized from ether to give 4.9 g. of N-thionitrosodimethylamine.

The dimethylthionylhydrazine used in this example was prepared by distilling a mixture of 15.0 g. (0.25 mole) of 1,1-dimethylhydrazine and 35 g. (0.25 mole) of thionylaniline. Dimethylthionylhydrazine was obtained as a light yellow liquid, B.P. 58.5–59° C. (10 mm.); $n_D^{25}$, 1.5406.

*Analysis.*—Calcd. for $C_2H_6N_2SO$: C, 22.63; H, 5.70; N, 26.40; S, 30.20. Found: C, 23.37; H, 5.96; N, 26.96; S, 30.22.

EXAMPLE 5

*N-thionitrosopiperidine*

A stirred solution of 9.7 g. (0.067 mole) of N-thionylaminopiperidine in 25 ml. of ether was cooled to $-50°$, and 18 ml. of 1 M solution (0.017 mole) of lithium aluminum hydride in ether was added dropwise over a period of 15 minutes. The mixture was allowed to warm to room temperature and stirred for one hour. The reaction mixture was filtered and the blue filtrate was concentrated by evacuation at 0.01 mm. pressure for 2 hours. N-thionitrosopiperidine, 3.25 g., was obtained as a purple oil. The nuclear magnetic resonance spectrum showed a multiplet from 1.3 ot 2.0 p.p.m. (relative area 3), a broad band centered at 3.8 p.p.m. (area 1), and a broad band centered at 4.3 p.p.m. (area 1) lower field from tetramethylsilane used as an internal reference.

The N-thionylaminopiperidine used in this example was prepared by distilling a mixture of 10.0 g. of 1-aminopiperidine and 13.4 g. of thionylaniline. N-thionylaminopiperidine was obtained as a light yellow liquid, B.P. 60–61° C. (0.2 mm.); $n_D^{25}$, 1.5603.

*Analysis.*—Calcd. for: $C_5H_{10}N_2OS$: C, 41.07; H, 6.91; N, 19.16; S, 21.93. Found: C, 41.02; H, 6.78; N, 18.97; S, 21.67.

When the compounds of the first column of Table I, below, are reacted with sulfur by Method I, or by the process of Example 1, the product is that of the second column of the table.

TABLE I

| Starting Material | Product |
|---|---|
| 1-methyl-1-cyclohexylhydrazine | N-thionitrosocyclohexylmethylamine. |
| 1,1-didodecylhydrazine | N-thionitrosodidodecylamine. |
| 1,1-diethylhydrazine | N-thionitrosodiethylamine. |
| 1-isopropyl-1-methylhydrazine | N-thionitrosomethylisopropylamine. |
| 1-amino-2,4-diethylpiperidine | 1-thionitroso-2,4-diethylpiperidine. |
| 1,1-dibutylhydrazine | N-thionitrosodibutylamine. |
| 1-aminopyrrolidine | N-thionitrosopyrrolidine. |
| 1-methyl-1-ethylhydrazine | N-thionitrosomethylethylamine. |
| N,N-decamethylenehydrazine | N-thionitrosodecamethyleneimine. |

When the compounds of the first column of Table II, below, are reduced with lithium aluminum hydride by Method II, or by the process of Example 4, the product is that of the second column of the table.

TABLE II

| Starting Material | Product |
|---|---|
| Diethylthionylhydrazine | N-thionitrosodiethylamine. |
| N-thionylaminohomopiperidine | N-thionitrosohomopiperidine. |
| N-thionylaminopyrrolidine | N-thionitrosopyrrolidine. |
| Ethylmethylthionylhydrazine | N-thionitrosoethylmethylamine. |
| Dipropylthionylhydrazine | N-thionitrosodipropylamine. |

The N-thionitrosoamines of this invention are useful as vinyl polymerization inhibitors, as illustrated by the following examples:

EXAMPLE A

A solution of 0.1 g. of N-thionitrosodimethylamine in 25 ml. of freshly distilled styrene was stored at 25° C. in contact with air. No polymerization occurred. $\alpha,\alpha'$-azodiisobutyronitrile, 0.1 g., was added to the styrene containing the thionitrosoamine, and the mixture was heated at 80° C. for 8 hours. Again no polymerization occurred.

A control sample of styrene polymerized on storage overnight in contact with air.

EXAMPLE B

A solution of 0.1 g. of N-thionitrosodimethylamine in 25 ml. of freshly distilled methyl methacrylate was stored at 25° C. in contact with air without polymerization. $\alpha,\alpha'$-azodiisobutyronitrile, 0.1 g., was added and the mixture was heated at 80° C. for 8 hours. No polymerization occurred.

A control sample of 25 ml. of uninhibited methyl methacrylate and 0.1 g. of $\alpha,\alpha'$-azodiisobutyronitrile was heated at 80° C. for 4 hours. Complete polymerization occurred.

Since obvious modifications and equivalents in the invention will be evident to those skilled in the chemical arts, I propose to be bound solely by the appended claims.

The embodiments of the invention in which an exclusive property or privilege is claimed are defined as follows:

1. A compound of the formula

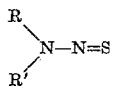

wherein R and R' are selected from the group consisting of alkyl of up to 12 carbons and alkylene of 2–12 carbons.

2. N-thionitrosodimethylamine.
3. N-thionitrosopiperidine.
4. N-thionitrosohomopiperidine.
5. The process which comprises reacting, at a temperature of 0–50° C. and in an inert reaction medium, elemental sulfur with a hydrazine of the formula

wherein R and R' are selected from the group consisting of alkyl of up to 12 carbons and alkylene of 2–12 carbons.

6. The process which comprises reacting, at a temperature of 0–50° C. and in an inert reaction medium, elemental sulfur with 1,1-dimethylhydrazine.

7. The process which comprises reacting, at a temperature of 0–50° C. and in an inert reaction medium, elemental sulfur with N-aminopiperidine.

8. The process which comprises reacting, at a temperature of 0–50° C. and in an inert reaction medium, elemental sulfur with N-aminohomopiperidine.

9. The process which comprises reducing with lithium aluminum hydride at a temperature of −100 to 0° C. and in an inert reaction medium a thionylhydrazine of the formula

RR′N—NSO wherein R and R' are selected from the group consisting of alkyl of up to 12 carbons and alkylene of 2–12 carbons.

10. The process which comprises reducing with lithium aluminum hydride at a temperature of −80° to −20° C. and in an inert reaction medium dimethylthionylhydrazine.

11. The process which comprises reducing with lithium aluminum hydride at a temperature of −80° to −20° C. and in an inert reaction medium N-thionylaminopiperidine.

References Cited
UNITED STATES PATENTS 2,514,017   7/1950   Wachters et al. _____ 260—583

OTHER REFERENCES

M. Goehring and A. Debo, Z. anorg. u. allgem. Chem. 273, 319 (1953).

M. Goehring and J. Weiss, Z. anorg. u. allgem. Chem. 278, 260 (1955).

A. Meuwsen and O. Jakob, Z. anorg. u. allgem. Chem. 263, 200 (1950).

O. Glemser, Angew. Chem., International Ed. in English 2, 530 (1963).

ALTON D. ROLLINS, *Primary Examiner.*